United States Patent [19]
Talbot et al.

[11] Patent Number: 5,970,998
[45] Date of Patent: Oct. 26, 1999

[54] MICROFABRICATED CANTILEVER RATCHET VALVE, AND METHOD FOR USING SAME

[75] Inventors: Neil H. Talbot, San Francisco; John Evans, El Cerrito; Kyle S. Lebouitz, Albany, all of Calif.

[73] Assignee: The Regents of the University of California, Oakland, Calif.

[21] Appl. No.: 09/032,249

[22] Filed: Feb. 27, 1998

[51] Int. Cl.⁶ ..................................................... F16K 31/02
[52] U.S. Cl. .......................... 137/1; 251/11; 251/129.06; 251/129.02
[58] Field of Search ................................ 251/11, 129.06, 251/129.01, 129.02; 137/1

[56] References Cited

U.S. PATENT DOCUMENTS 5,323,999  6/1994  Bonne et al. ............................. 251/11

OTHER PUBLICATIONS

Jerman, "Electrically–Activated, Normally–Closed Diaphragm Valves", *J. Micromech. Microeng.*, 4:210–216 (1994).

Wise, "A Multielectrode Microprobe for Biopotential Recording", Ph.D. Dissertation, Stanford University, May, 1969.

*Primary Examiner*—Kevin Lee
*Attorney, Agent, or Firm*—William S. Galliani; Pennie & Edmonds LLP

[57] ABSTRACT

A microfabricated valve includes a substrate with a fluid path. A main cantilever is positionable in a resting closed state to prevent fluid movement through the fluid path and a resting open state that allows fluid movement through the fluid path. A ratchet cantilever supports the main cantilever in either the resting closed state or the resting open state, such that the main cantilever does not have to be energized to maintain the resting closed state or the resting open state. A valve state transition mechanism selectively energizes the main cantilever or the ratchet cantilever during a valve state transition period to selectively transition between the resting open and closed states.

22 Claims, 8 Drawing Sheets

MICROFABRICATED CANTILEVER RATCHET VALVE, AND METHOD FOR USING SAME

BRIEF DESCRIPTION OF THE INVENTION

This invention relates generally to miniature instruments commonly called micromachines. More particularly, this invention relates to a micromachine that operates as a cantilevered ratchet valve.

BACKGROUND OF THE INVENTION

Micromachines (also called micromechanical devices or microelectromechanical devices) are small (micron scale) machines which promise to miniaturize instrumentation in the same way microelectronics have miniaturized electronic circuits. Micromachines include a variety of devices such as motors and gear trains analogous to conventional macroscale machinery. As used herein, the term micromachine or microfabricated refers to any three-dimensional object having one or more sub-millimeter dimensions.

Micromachines have been applied to fluid systems, such as chemical delivery systems. Valves are the most important element in any fluid system because they are the building blocks for almost any kind of fluid control. Valves are essential to direct the flow of fluid and are necessary for most types of pumps. The most common valve in the realm of microfabricated devices is the diaphragm valve. Diaphragm valves come in many forms, but consist primarily of an actuated or energized diaphragm that pushes against an aperture associated with a fluid path. In such a system, the fluid flow is modulated by moving the diaphragm closer to or away from the fluid path aperture. The diaphragm may be actuated by any of a variety of methods including piezoelectric, electrostatic, bimetallic, and phase change.

Although diaphragm valves are not difficult to fabricate as individual devices, they are difficult to fabricate monolithically with other kinds of fluidic components, such as pumps and mixers. Bubble valves solve the problem of system integration. However, bubble valves can only withstand relatively low pressure differentials. Further, bubble valves require a relatively large amount of power, making them unsuitable for many applications.

Another problem with diaphragm valves is that they typically require a continuous input of power to maintain either the open or closed state. Continuous power input to maintain a valve state is a serious liability for low power applications.

In view of the foregoing, it would be highly desirable to develop a new type of microfabricated valve. More particularly, it would be desirable to develop a relatively high pressure valve that consumes a relatively low amount of power. Such a valve should be able to be monolithically fabricated with other fluid components, such as pumps and mixers.

SUMMARY OF THE INVENTION

The apparatus of the invention is a microfabricated valve including a substrate with a fluid path. A main cantilever is positionable in a resting closed state to prevent fluid movement through the fluid path and a resting open state that allows fluid movement through the fluid path. A ratchet cantilever supports the main cantilever in either the resting closed state or the resting open state, such that the main cantilever does not have to be energized to maintain the resting closed state or the resting open state. A valve state transition mechanism selectively energizes the main cantilever or the ratchet cantilever during a valve state transition period to selectively transition between the resting open and closed states.

The method of the invention includes the step of energizing a main cantilever into a deflected state until it engages a ratchet cantilever. The main cantilever is then de-energized such that the ratchet cantilever supports the main cantilever in a locked state. The ratchet cantilever is then energized until it disengages the main cantilever, thereby forcing the main cantilever into a free valve state. The ratchet cantilever is then de-energized when the main cantilever is in the free valve state.

The microfabricated cantilever ratchet valve of the invention consumes little power because it is only energized during valve state transitions. In other words, the device is low powered because it is not energized during open valve states and closed valve states. The valve of the invention withstands relatively high pressures. Further, the valve of the invention can be monolithically fabricated with other fluid components, such as pumps and mixers.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

The invention is a micromachined valve for fluidic systems that requires no energy input to remain open or to remain closed. In the preferred embodiment, the cantilevers that form the moving parts of the valve are actuated by differential heating. One side of each cantilever contains a doped polysilicon heating element. Electricity is applied to those heating elements, which creates a thermal gradient across the width of the cantilever. The thermal gradient causes the cantilever to bend due to the different amounts of thermal expansion on one side of the cantilever as compared to the other. Electricity only needs to be applied when changing the state of the valve.

Figure 1:
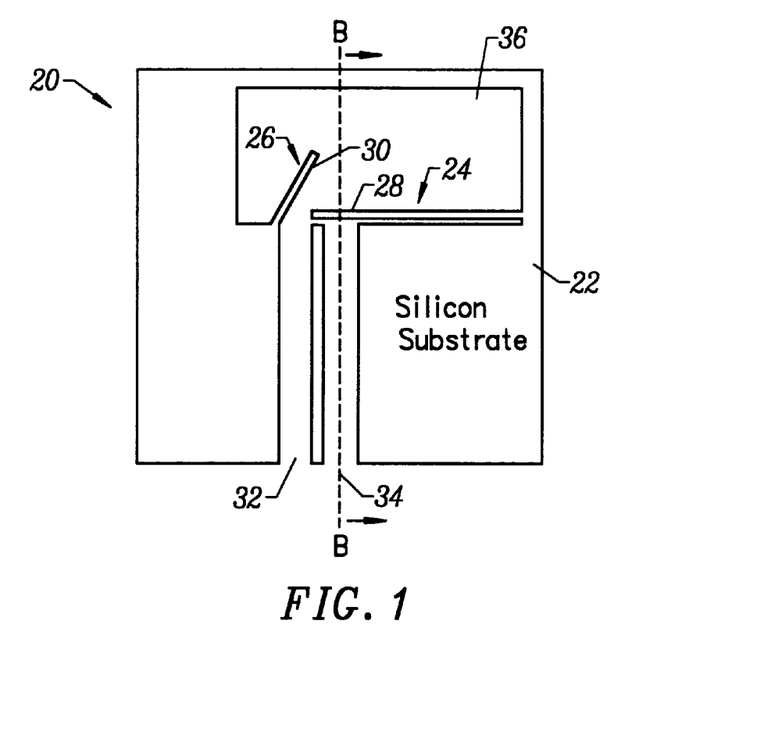
FIG. 1 is a plan view of a microfabricated cantilever ratchet valve in a closed state.

FIG. 1 is a plan view of a microfabricated cantilever ratchet valve 20 in accordance with an embodiment of the invention. The device 20 is preferably fabricated in a silicon substrate 22. As described below, the substrate 22 is processed to create a main cantilever 24 and a ratchet cantilever 26. A valve state transition mechanism is used to move the main cantilever 24 and the ratchet cantilever 26. In one embodiment of the invention, the valve state transition mechanism is implemented with a main cantilever polysilicon heating structure formed in the main cantilever 24, and a ratchet cantilever polysilicon heating structure 30 formed in the ratchet cantilever 26.

The substrate 22 also has an inlet fluid path 32 and an outlet fluid path 34 fabricated into it. In FIG. 1, the main cantilever 24 is blocking the outlet fluid path 34, thus the valve 20 is in a closed state.

FIG. 1 also illustrates a cantilever motion aperture 36 formed in the substrate 22. The aperture 36 allows the cantilevers 24 and 26 to move, as described below.

Figure 2:
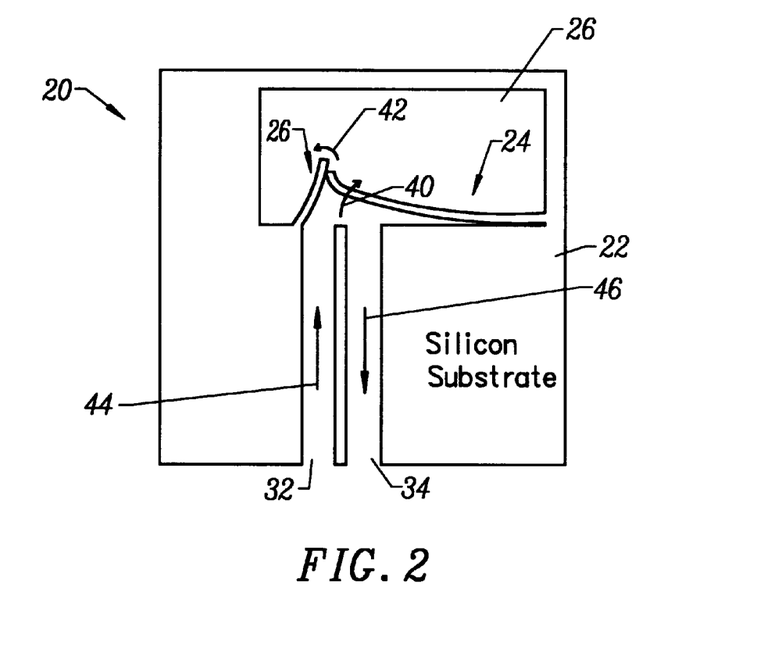
FIG. 2 is a plan view of a microfabricated cantilever ratchet valve in a transition state.

FIG. 2 illustrates the valve 20 in a transition valve state, moving from a closed state to an open state. The main cantilever polysilicon heating structure 28 is energized when moving from a closed valve state to an open valve state. The energized main cantilever polysilicon heating structure creates a thermal gradient between the bottom side of the main cantilever 24 adjacent to the silicon substrate 22 and the top side of the main cantilever 24 exposed to the cantilever motion aperture 36. This thermal gradient causes the main cantilever 24 to deflect into the cantilever motion aperture 36, as shown with arrow 40. The main cantilever 24 continues to deflect until it engages the ratchet cantilever 26. The main cantilever 24 pushes the ratchet cantilever 26 back, as shown with arrow 42. The main cantilever 24 continues to deflect until its tip passes the tip of the ratchet cantilever 26. This causes the ratchet cantilever 26 to spring back in a direction opposite of the direction shown with arrow 42. The ratchet cantilever 26 is then positioned on the underside of the main cantilever 24, preventing it from covering the outlet fluid path 34. The ratchet cantilever 26 and the main cantilever 24 remain in this position, even after the main cantilever is de-energized. As a result, the valve 20 is in an open state.

Figure 3:
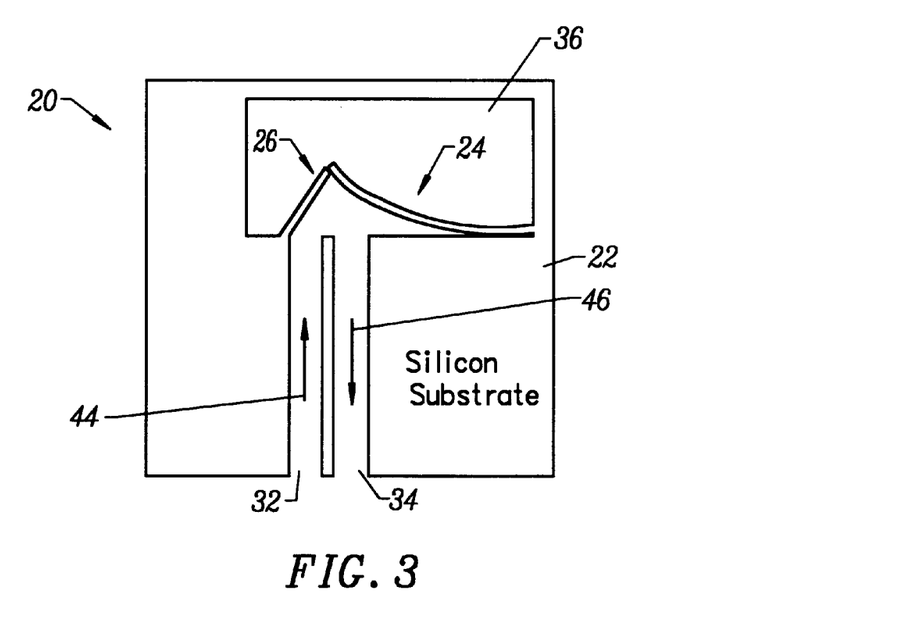
FIG. 3 is a plan view of a microfabricated cantilever ratchet valve in an open state.

FIG. 3 is a plan view of the valve 20 in an open state. In the figure, arrow 44 represents inlet fluid flow, while arrow 46 represents outlet fluid flow.

Figure 4:
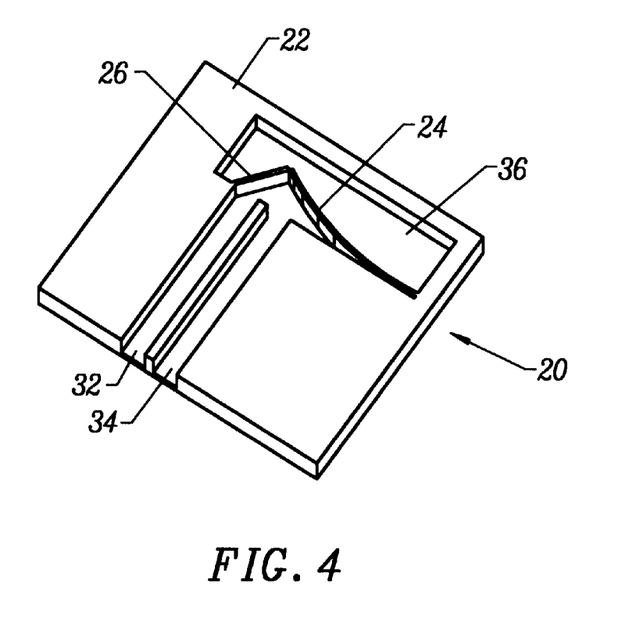
FIG. 4 is a perspective view of a microfabricated cantilever ratchet valve.

FIG. 4 is a perspective view of the valve 20 in an open state. The figure dimensionally illustrates the main cantilever 24, the ratchet cantilever 26, the inlet fluid path 32, the outlet fluid path 34, and the cantilever motion aperture 36.

The valve 20 returns to a closed state by energizing the ratchet cantilever polysilicon heating structure 30. This causes the ratchet cantilever 26 to deflect in the direction shown by arrow 42 in FIG. 2 until the ratchet cantilever 26 passes beyond the tip of the main cantilever 24. When this occurs, the main cantilever 24 is no longer supported by the ratchet cantilever 24 and therefore it snaps back to its original position, shown in FIG. 1.

Thus, it can be appreciated that the valve 20 of the invention has a "resting" closed state where energy need not be applied to prevent fluid flow, and a "resting" open state where energy need not be applied to facilitate fluid flow. This allows the valve of the invention to consume relatively little power. Further, the cantilever configuration of the invention can withstand relatively high fluid pressures compared to bubble valves. As will be more fully appreciated after the following discussion, the valve of the invention can be monolithically fabricated with other fluid components, such as pumps and mixers.

Those skilled in the art will appreciate that there are many ways to fabricate the device of the invention. One process flow for the preferred embodiment is shown in FIGS. 5a–5k.

The following processing steps have been used, as described below, to construct a variety of devices, in accordance with the invention. Those skilled in the art will appreciate that a variety of modifications on the specified steps are feasible, yet still within the scope of the invention.

Table I—Preferred Fabrication Steps
A. Standard Clean Wafers
   VLSI lab sink
   Piranha clean ($H_2SO_4$:$H_2O_2$, 5:1) 10 minutes
   Two, one minute rinses in de-ionized (DI) water
   Rinse until resistivity of water is >11 MΩ-cm
   Spin dry
   Piranha clean ($H_2SO_4$:$H_2O_2$, 5:1) 10 minutes
   Rinse in DI water for one minute
   Dip in 25:1 HF until hydrophobic
   Two, one minute rinses in de-ionized (DI) water
   Rinse until resistivity of water is >14 MΩ-cm
   Spin dry
B. Clean Wafers with Minimal Oxide Strip
   VLSI lab sink
   Piranha clean ($H_2SO_4$:$H_2O_2$, 5:1) 10 minutes
   Rinse in DI water for one minute
   Dip in 25:1 HF briefly until native silicon oxide removed
   Two, one minute rinses in DI water
   Rinse until resistivity of DI water is >14 MΩ-cm
   Spin dry
C. Partial Clean Wafers
   VLSI lab sink
   Piranha clean ($H_2SO_4$:$H_2O_2$, 5:1) 10 minutes
   Two, one minute rinses in de-ionized (DI) water
   Rinse until resistivity of water is >11 MΩ-cm
   Spin dry
D. Deposit Low-Stress Silicon Nitride
   Horizontal low pressure chemical vapor deposition reactor
   Target thickness as specified
   Conditions=835° C., 140 mTorr, 100 sccm DCS, and 25 sccm $NH_3$
E. Deposit Phosphosilicate Glass(PSG)
   Horizontal low pressure chemical vapor deposition reactor
   Target thickness as specified
   Conditions=450° C., 300 mTorr, 60 sccm $SiH_4$, 90 sccm $O_2$, and 10.3 sccm $PH_3$
G. Reflow Phosphosilicate Glass
F. Deposit Low Temperature Oxide (LTO)
   Horizontal low pressure chemical vapor deposition reactor
   Target thickness as specified Conditions=450° C., 300 mTorr, 60 sccm SiH$_4$, 90 sccm O$_2$, and 10.3 sccm PH$_3$ G. Reflow Phosphosilicate Glass G. Reflow Phosphosilicate Glass Horizontal atmospheric pressure reactor Conditions=1000° C., N$_2$, 1 hour H. Photolithography
  1. HMDS prime
  2. Photoresist coat
     Coat 1 $\mu$m of Shipley S3813 (thickness may need to be varied depending on topography and thickness of material to be etched) multi-wavelength positive resist
  3. Expose resist
     G-Line wafer stepper
     Standard exposure time
  4. Resist develop
     Standard develop using Shipley MF 319
  5. Hard bake for 30 minutes I. Coat Backside with Photoresist
  1. HMDS prime
  2. Photoresist coat
     Coat 1 $\mu$m of Shipley S3813 (thickness may need to be varied depending on topography and thickness of material to be etched) multi-wavelength positive resist
  3. Resist develop
     Standard develop using Shipley MF 319
  4. Hard bakefor 30 minutes J. Oxide Wet Etching
  VLSI lab sink
  Etch in 5:1 BHF until desired amount of oxide has been removed
  Two, one minute rinses in DI water
  Rinse until resistivity of water is >11 M$\Omega$-cm
  Spin dry K. Photoresist Strip
  Lab sink
  PRS-2000, heated to 90° C., 10 minutes
  Rinse in three baths of DI water, 2 minutes each C. Partial, Clean Wafers L. Silicon Nitride Etch
  SF$_6$+He plasma etch
  Etch until desired amount of nitride has been removed M. Deposit Undoped Polysilicon
  Horizontal low pressure chemical vapor deposition reactor
  Target thickness as specified
  Conditions=580° C., 300 mTorr, and 100 sccm SiH$_4$ N. Anisotropic Polysilicon Etch
  Chlorine plasma etch
  Etch until desired amount of polysilicon has been removed 0. Nitrogen Anneal
  Horizontal atmospheric pressure reactor
  Conditions=1000° C., N$_2$, 1 hour P. Anisotropic Silicon Wet Etch
  Lab sink, heated bath
  750 g KOH: 1500 ml H$_2$O
  Temperature: 80° C.

Figure 5A:
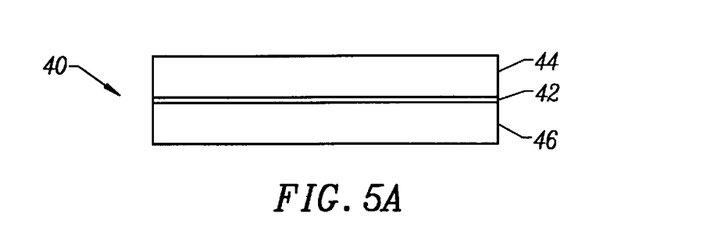
FIGS. 5a–5k illustrate the construction of a microfabricated cantilever ratchet valve in accordance with an embodiment of the invention.

Q. Oxide Removal Wet Etching
  Lab sink
  Etch in diluted HF or buffered HF until desired oxide removed
  Rinse in deionized water for approximately one hour R. Deep Trench Etch
  Inductively coupled plasma etcher
  Advanced silicon etch process
  High plasma density low pressure processing system
  Fluorine plasma
  Etch to desired depth S. Sacrificial Oxide, PSG and Silicon Nitride Removal
  Lab sink
  Concentrated HF dip with surfactant if needed, continue until desired sacrificial material has been removed
  Rinse for 2 minutes in two tanks of DI water
  Rinse for 120 minutes in third tank of DI water T. Sputter Gold
  Low pressure chamber
  Gold target U. Gold Etch
  Lab sink
  Aqua regent etchant or other commercially available gold etchant V. Wet Oxidation
  Horizontal atmospheric pressure reactor
  Conditions=Temperature as specified, water vapor environment W. Boron Diffusion
  Horizontal atmospheric pressure reactor
  Solid source boron diffusion
  Conditions=Temperature as specified X. Deposit In Situ Doped Polysilicon
  Horizontal low pressure chemical vapor deposition reactor
  Target thickness as specified
  Conditions=610° C. and 300 mTorr Y. Etch Back to the Substrate
  Chemical mechanical polish machine
  Stop on silicon substrate The device may be fabricated using a Silicon On Insulator (SOI) wafer. As known in the art and as shown in FIG. 5a, an SOI wafer 40 includes an insulator layer 42 sandwiched between a device wafer 44 and a handle wafer 46. The device of the invention has been fabricated with a 525 $\mu$m SOI wafer 40. The SOI wafer 40 had a 50 $\mu$m device wafer 46 formed of single crystal silicon with an orientation of <100>. A 0.5 $\mu$m silicon dioxide layer was used as the insulator 42. The handle wafer 46 was 475 $\mu$m thick single crystal silicon with a <100>orientation.

Figure 5B:
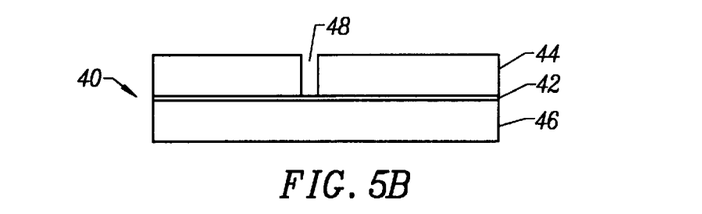
Figure 5C:
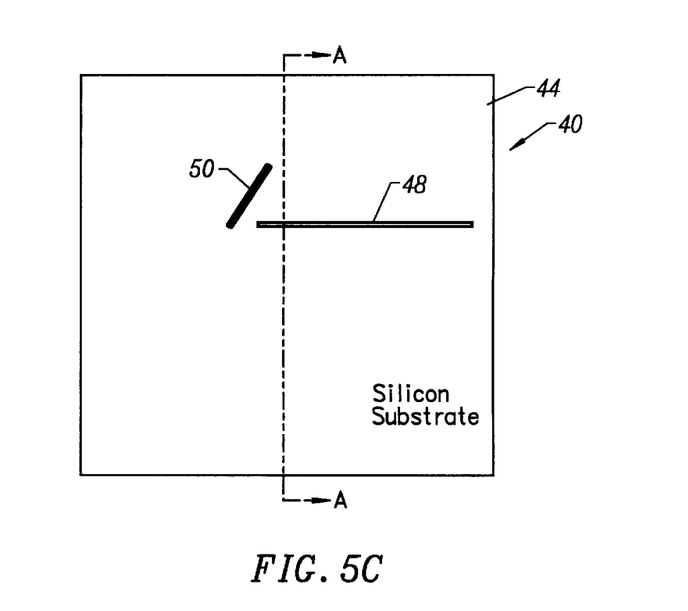

The starting SOI wafer 40 is cleaned (step A). A photolithography operation (step H) is then performed using a first mask to expose what will become the heater areas of the device. The heater areas are then subject to a deep trench etch (step R). The device has been fabricated with trench widths of approximately 3 microns. FIG. 5b is a cross-sectional illustration of a resultant trench 48. FIG. 5b is taken along the line A—A of FIG. 5c, which is a plan view of the SOI wafer 40. FIG. 5c illustrates a trench 48 which will be associated with the main cantilever, and a second trench 50 which will be associated with the ratchet cantilever. The Photoresist is then stripped (step K).

Figure 5D:
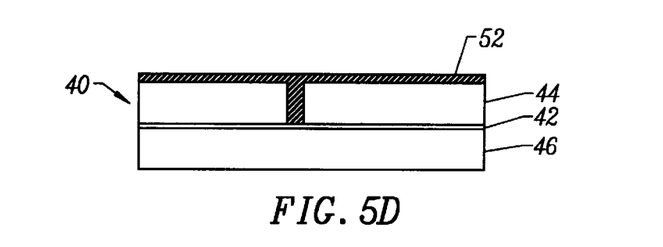
Figure 5E:
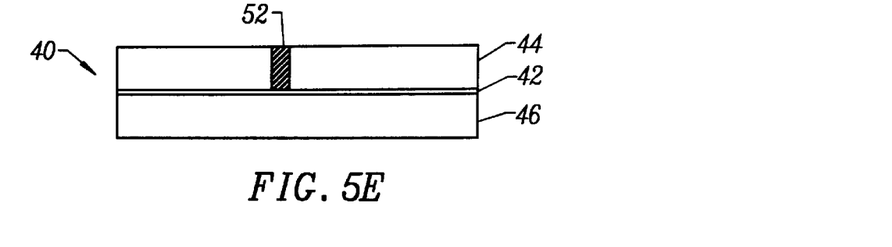
Figure 5F:
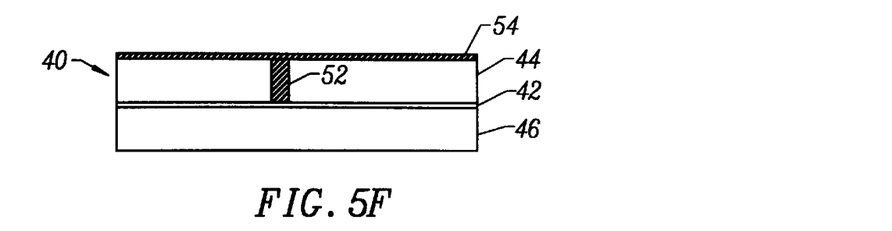
Figure 5G:
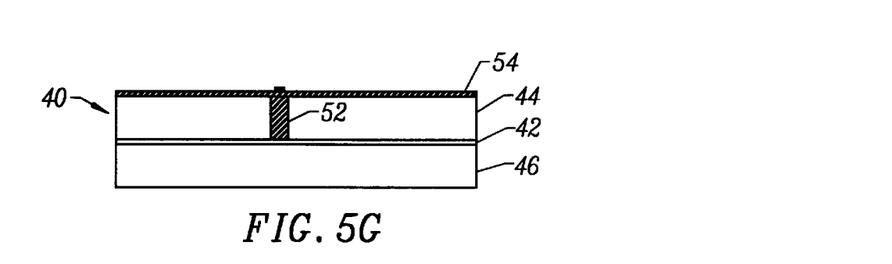

The trenches are then filled with approximately 1.5 microns of doped polysilicon (step X). FIG. 5d illustrates the polysilicon 52. A chemical mechanical polishing back to the silicon substrate is then performed (step Y), resulting in the device shown in FIG. 5e. One micron of undoped polysilicon is then deposited (step M). FIG. 5f shows the undoped polysilicon layer 54. Gold is then sputtered (step T). A photolithography step is then performed (step H), leaving everything but wire trace areas exposed. The gold is then etched (step U). The photoresist is then stripped (step K). FIG. 5g illustrates the resultant gold wire trace 56.

Figure 5H:
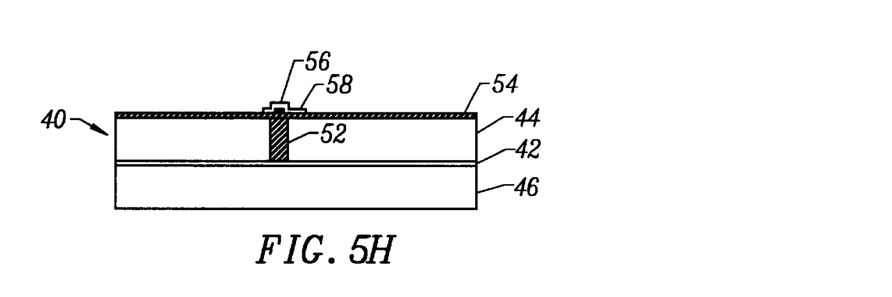
Figure 5I:
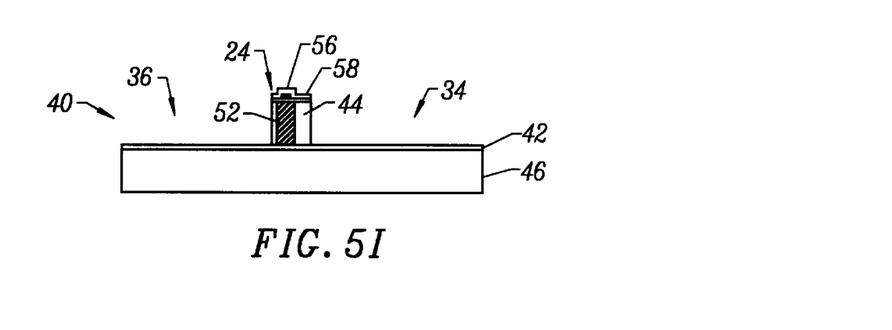

A photolithography operation (step H) is then performed to leave the fluid channel areas exposed. FIG. 5h illustrates the resultant photoresist 58. A deep trench etch down to the oxide layer (step R) is then performed. The resultant device is shown in FIG. 5i. FIG. 5i is a view taken along the line B—B of FIG. 1. Observe then that the area to the right of the main cantilever 24 corresponds to the outlet fluid path 34, while the area to the left of the main cantilever 24 corresponds to the cantilever motion aperture 36.

Figure 5J:
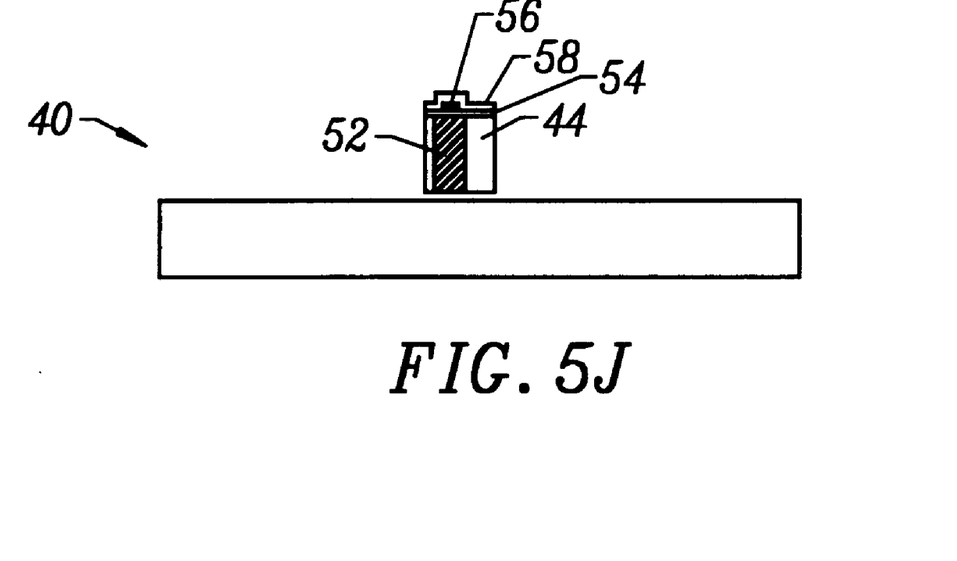

The sacrificial oxide layer is then etched (step S). The resultant device is shown in FIG. 5j. The cantilevers are now free to move. Care must be taken not to overetch because overetching will cause valve leakage.

Figure 5K:
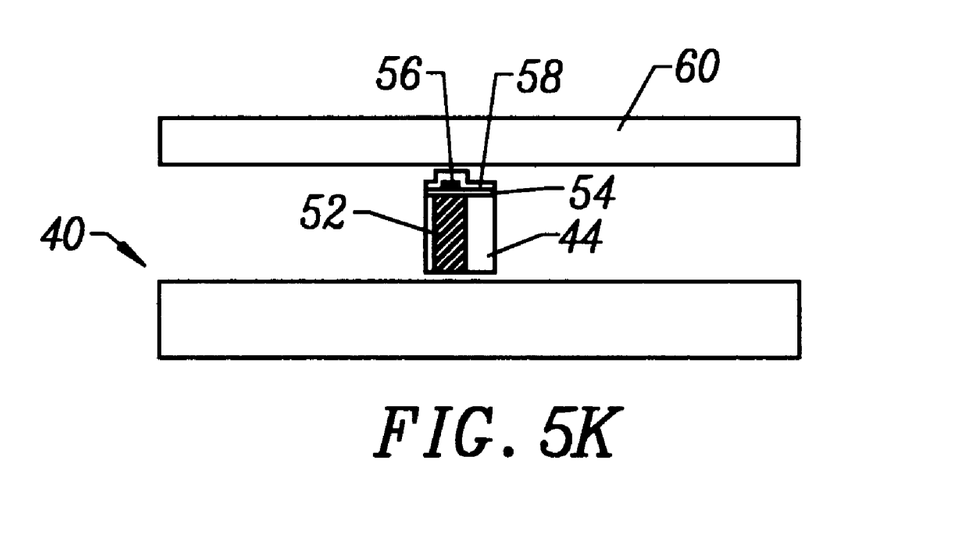

A quartz cover wafer is then bonded on top of the silicon device wafer using an epoxy, photoresist or some other bond. The quartz cover 60 is illustrated in FIG. 5k.

Figure 6:
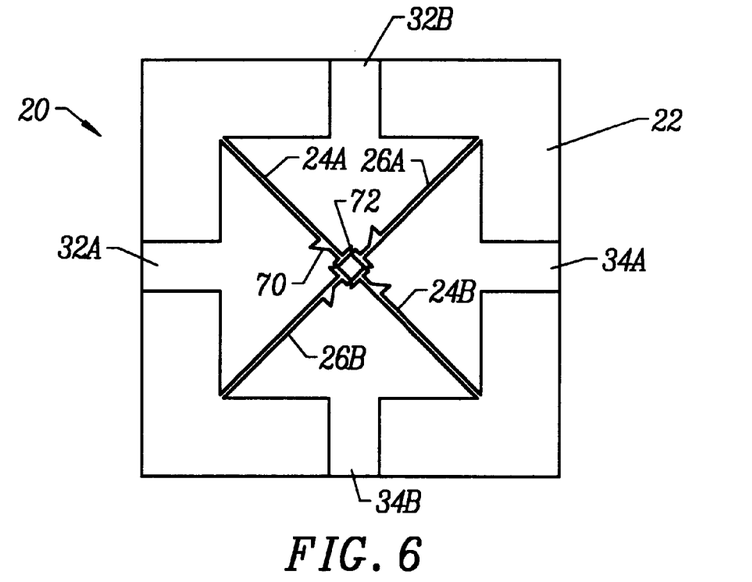
FIG. 6 is a plan view of a microfabricated cantilever ratchet valve in accordance with another embodiment of the invention.

Those skilled in the art will appreciate that there are numerous ways to implement the technology of the invention. FIG. 6 illustrates a multiple cantilever embodiment of the invention. In particular, the figure shows two main cantilevers 24A, 24B and two ratchet cantilevers 26A, 26B. Each cantilever of FIG. 6 includes a barb 70 and a cantilever flanged head 72. As shown below, each cantilever of FIG. 6 can operate as both a main cantilever and as a ratchet cantilever. FIG. 6 also illustrates that the multiple cantilever apparatus 20 controls two fluid paths, including inlet fluid paths 32A, 32B and outlet fluid paths 34A, 34B.

Figure 7:
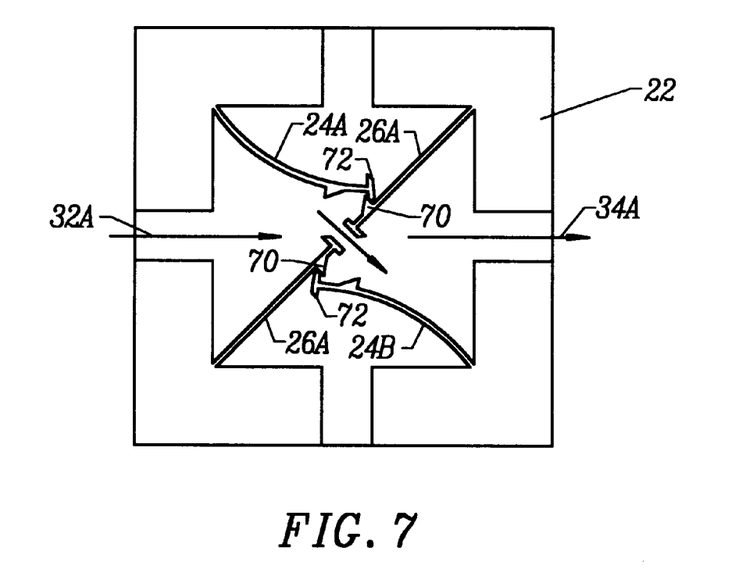
FIG. 7 is a plan view of the microfabricated cantilever ratchet valve of FIG. 6 in an open state for a first fluid path.
Figure 8:
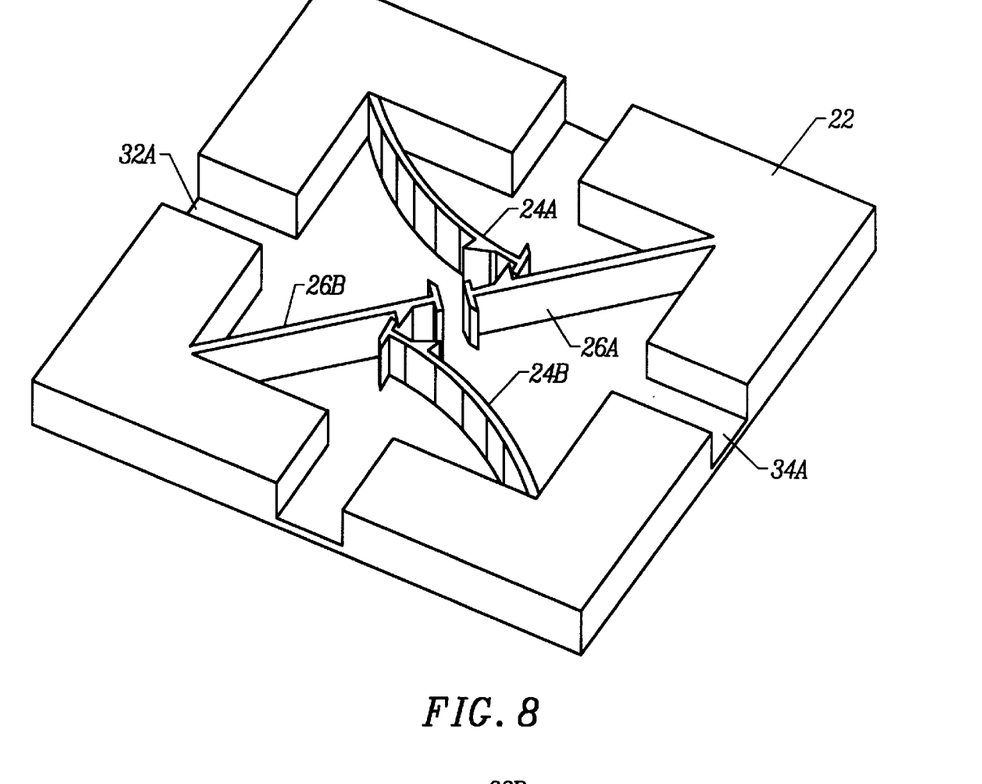
FIG. 8 is a perspective view of the microfabricated cantilever ratchet valve of FIG. 7.

In order to route fluid through the first fluid path 32A, 34A, main cantilevers 24A and 24B are actuated in the manner previously described. This causes the cantilever flanged heads 72 of the main cantilevers 24A and 24B to engage the barbs 70 of ratchet cantilevers 26A and 26B, as shown in FIG. 7. This allows fluid to pass through the inlet fluid path 32A to the outlet fluid path 34A. FIG. 8 is a perspective view of the device of FIG. 7.

Figure 9:
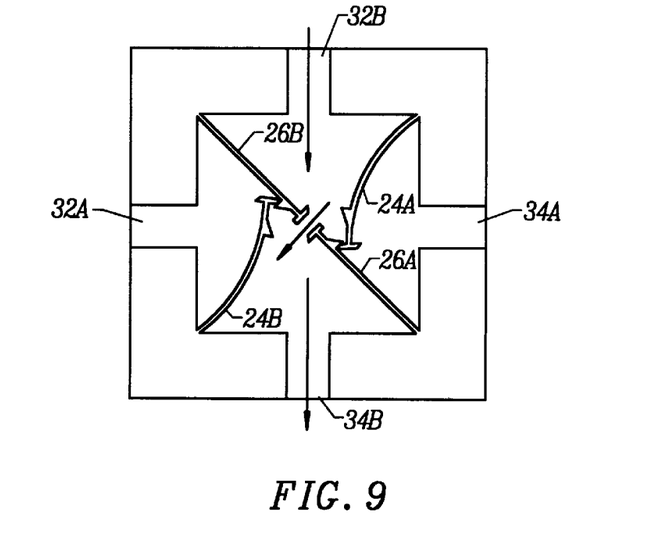
FIG. 9 is a plan view of the microfabricated cantilever ratchet valve of FIG. 6 in an open state for a second fluid path.

FIG. 9 illustrates how the same device is used to route fluid through the second fluid path 32B, 34B. Observe that in FIG. 9, the main cantilevers 24A and 24B, were the ratchet cantilevers 26A and 26B of FIG. 8. Thus, it can be appreciated that each cantilever of the embodiments of FIGS. 6–9 can operate as either a main cantilever or as a ratchet cantilever.

Figure 10:
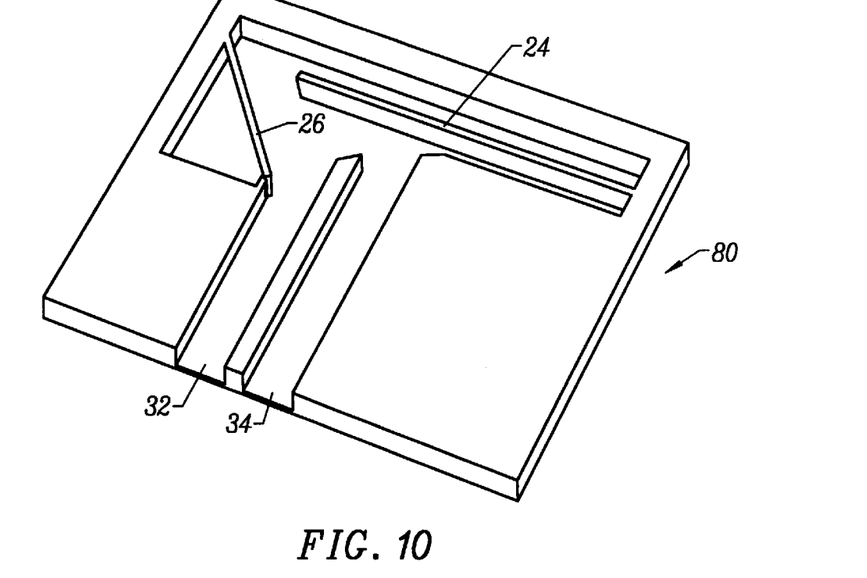
FIG. 10 is a perspective view of the microfabricated cantilever ratchet valve of the invention configured for a normally open state.
Figure 11:
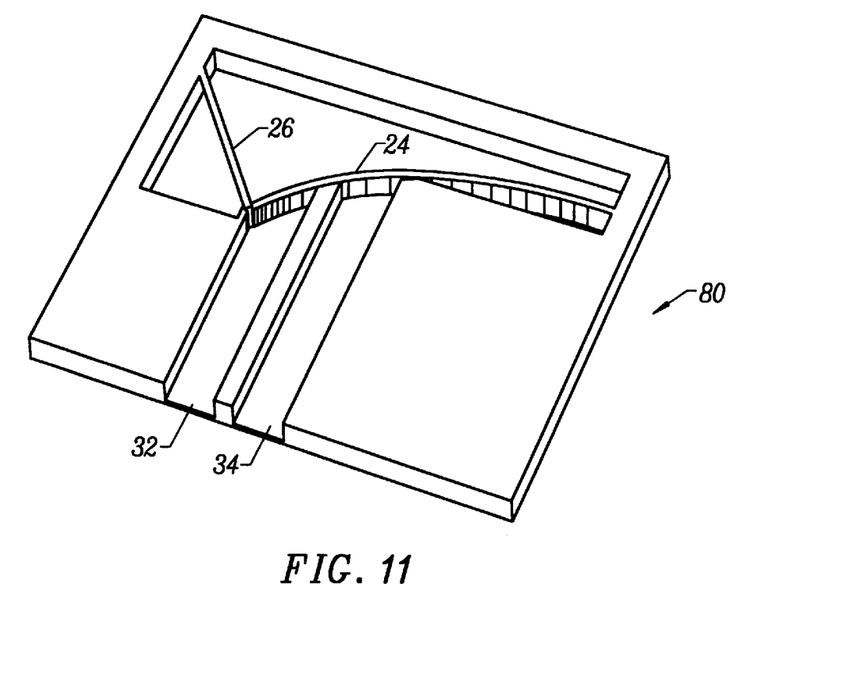
FIG. 11 is a perspective view of the microfabricated cantilever ratchet valve of FIG. 10 in a closed state.

FIG. 10 illustrates a microfabricated cantilever ratchet valve 80 in accordance with another embodiment of the invention. The device 80 of FIG. 10 is in a normally open state. That is, the main cantilever 24 normally allows a path between the inlet fluid path 32 and the outlet fluid path 34. When the device 80 is activated, the main cantilever 24 obstructs the path between the inlet fluid path 32 and the outlet fluid path 34, as shown in FIG. 11.

Those skilled in the art will appreciate that there are a number of ways to actuate the cantilevers of the invention. For example, a piezo-electric material, such as PZT or ZnO, deposited on one side of the cantilever could provide the actuation force required. Also, if the spring constant of the cantilvers is reduced they could be actuated by thermal bubble or electrolysis bubble. Other possible actuation methods include magnetic and electrostatic actuation.

Although bulk micromachining of silicon is the preferred method of fabricating devices of the invention, there are other methods available. Injection molding of plastic has been refined to the point that very tiny structures, such as the cantilever ratchet valve, could be injection molded. Also, the cantilever ratchet valve could be fabricated by using new photoresists and UV curable epoxies that can be spun on, or otherwise thinly applied, and then features and components are photolithographically defined in the material. In addition to bulk micromachining in silicon, micromachining of other materials, such as quartz, glass, polysilicon and silicon nitride could be used. In all photolithography steps in the fabrication of the cantilever ratchet valve, alternate methods of lithography could be used, such as X-ray lithography and electron beam lithography.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A microfabricated valve, comprising:
    a substrate with a fluid path;
    a main cantilever positionable in a resting closed state that prevents fluid movement through said fluid path and a resting open state that allows fluid movement through said fluid path;
    a ratchet cantilever to support said main cantilever in either said resting closed state or said resting open state, such that said main cantilever does not have to be energized to maintain said resting closed state or said resting open state; and
    a valve state transition mechanism to selectively energize said main cantilever or said ratchet cantilever during a valve state transition period, and thereby selectively transition between said resting open and closed states.

2. The apparatus of claim 1 wherein said substrate, main cantilever, and ratchet cantilever are formed of silicon.

3. The apparatus of claim 2 wherein said main cantilever and said ratchet cantilever are lithographically formed.

4. The apparatus of claim 1 wherein said substrate, main cantilever, and ratchet cantilever are formed of a polymer.

5. The apparatus of claim 4 wherein said substrate, main cantilever, and ratchet cantilever are formed by injection molding.

6. The apparatus of claim 1 wherein said valve state transition mechanism includes a heating structure attached to said main cantilever and said ratchet cantilever, said heating structure selectively creating thermal gradients to deflect, during said valve state transition period, said main cantilever or said ratchet cantilever between said resting open and closed states.

7. The apparatus of claim 1 wherein said valve state transition mechanism includes a piezo-electric material attached to said main cantilever and said ratchet cantilever, said piezo-electrical material selectively deflecting said main cantilever or said ratchet cantilever, during said valve state transition period, between said resting open and closed states.

8. The apparatus of claim 1 wherein said valve state transition mechanism operates to alter the size of bubbles, the expansion and contraction of which, deflect said main cantilever or said ratchet cantilever, during said valve state transition period, between said resting open and closed states.

9. The apparatus of claim 1 wherein said main cantilever includes a barb.

10. The apparatus of claim 1 wherein said main cantilever includes a flanged head.

11. The apparatus of claim 1 wherein said ratchet cantilever includes a barb.

12. The apparatus of claim 1 wherein said ratchet cantilever includes a flanged head.

13. A method of operating a microfabricated valve that maintains a resting open state and a resting closed state, said method comprising the steps of:
   energizing a main cantilever into a deflected state until said main cantilever engages a ratchet cantilever;
   de-energizing said main cantilever such that said ratchet cantilever supports said main cantilever in a locked state; and
   energizing said ratchet cantilever until said main cantilever disengages said main cantilever thereby forcing said main cantilever into a free valve state.

14. The method of claim 13 further comprising the step of de-energizing said ratchet cantilever when said main cantilever is in said free valve state.

15. The method of claim 13 wherein said step of energizing said main cantilever includes the step of energizing a heating structure associated with said main cantilever to create a thermal gradient that produces said deflected state.

16. The method of claim 13 wherein said step of energizing said ratchet cantilever includes the step of energizing a heating structure associated with said ratchet cantilever to create a thermal gradient that causes said ratchet cantilever to disengage from said main cantilever.

17. The method of claim 13 wherein said step of energizing said main cantilever includes the step of energizing a piezo-electric structure associated with said main cantilever to create said deflected state.

18. The method of claim 13 wherein said step of energizing said ratchet cantilever includes the step of energizing a piezo-electric structure associated with said ratchet cantilever to cause said ratchet cantilever to disengage from said main cantilever.

19. The method of claim 13 wherein said step of energizing said main cantilever includes the step of altering the size of a gas bubble associated with said main cantilever to create said deflected state.

20. The method of claim 13 wherein said step of energizing said ratchet cantilever includes the step of altering the size of a gas bubble associated with said ratchet cantilever to cause said ratchet cantilever to disengage from said main cantilever.

21. A microfabricated valve, comprising:
   a planar substrate with a main cantilever and a fluid path, said fluid path providing a path through which fluid travels parallel to said substrate in a parallel fluid flow, and said main cantilever operating to selectively obstruct said parallel fluid flow in said fluid path, wherein said planar substrate includes a ratchet cantilever to support said main cantilever in either a resting closed state or a resting open state, such that said main cantilever does not have to be energized to maintain said resting closed state or said resting open state.

22. The apparatus of claim 21 further comprising a valve state transition mechanism to selectively energize said main cantilever and said ratchet cantilever.

* * * * *